United States Patent [19]
Wardle

[11] 3,983,278
[45] Sept. 28, 1976

[54] METHOD OF MAKING A THERMOPLASTIC PILE SHEET

[75] Inventor: Glynn Arthur Wardle, Ramsbottom, England

[73] Assignee: Imperial Chemical Industries Limited, London, England

[22] Filed: Sept. 16, 1974

[21] Appl. No.: 506,541

[30] Foreign Application Priority Data
Sept. 27, 1973 United Kingdom............... 45226/73

[52] U.S. Cl.................................. 428/92; 264/164; 264/167; 264/284; 264/322; 264/331; 264/345

[51] Int. Cl.²......................................... B29C 17/00

[58] Field of Search........... 264/164, 167, 171, 248, 264/345, 241, 243, 280, 284, 331, 346, 342, 230, 234, 237, 235, 175, 322, 259; 156/72, 282, 306, 311; 428/85, 92, 95

[56] References Cited
UNITED STATES PATENTS

| | | |
|---|---|---|
| 2,714,571 | 8/1955 | Irion et al............................ 156/311 |
| 3,075,868 | 1/1963 | Long.................................... 156/282 |
| 3,150,024 | 9/1964 | Penman............................... 156/229 |
| 3,708,565 | 1/1973 | Seiffert............................... 264/171 |
| 3,767,749 | 10/1973 | Chiba.................................. 264/322 |
| 3,878,011 | 4/1975 | Currell et al........................ 156/72 |

*Primary Examiner*—Willard E. Hoag
*Attorney, Agent, or Firm*—Cushman, Darby & Cushman

[57] ABSTRACT

A process for improving the abrasion resistance of a pile surfaced material comprising fibrils or tufts of a thermoplastic material integrally formed with a sheet of the thermoplastic material said sheet having been bonded to a backing substrate by melting of the thermoplastic material, said process comprising subsequently heating the pile surfaced material from the substrate side to a temperature such that and for such a time that softening of the thermoplastic occurs but no substantial collapse of the pile occurs.

10 Claims, 1 Drawing Figure

U.S. Patent  Sept. 28, 1976  3,983,278
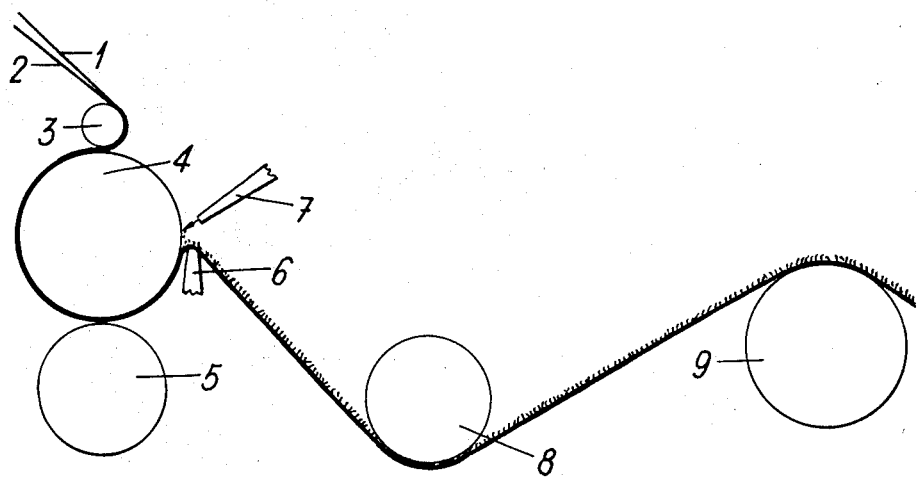

METHOD OF MAKING A THERMOPLASTIC PILE SHEET

The present invention relates to improvements in or relating to the production of pile surfaced materials. It is already known that pile surfaced materials may be produced from thermoplastic materials by pressing a sheet of the material against a heated surface so that at least the surface of the sheet is melted and then drawing the sheet away from the heated surface in such a way that fibrils are drawn out from the surface of the sheet. It has also been proposed that an improved pile may be obtained by cooling the fibrils as they are produced to ensure that they remain integral with the sheet of thermoplastic material rather than adhering permanently to the heated surface. It has been proposed that this fibril making process may be achieved by passing the plastic material between two belts one of which is heated, between a belt and a heated roll or between two rollers one of which is heated and the other cool. It has also been suggested that a backing material such as paper or a woven or non-woven fabric may be passed together with the sheet of thermoplastic material through such an apparatus in such a way that the thermoplastic material is adjacent to the heated surface and the backing material is on the other side of the thermoplastic. In this way the thermoplastic will be melted by the heated surface and thus bonded to the backing material at the same time as the fibrils are drawn out from the surface adjacent to the heated surface.

One problem that arises with products produced by such a process is that the abrasion resistance of the pile can be poor and at times the fibrils are too easily separated from the backing during use of the pile surfaced material which limits the wearability of the product in certain applications. It is known that when the pile has been produced from a thermoplastic material it may be collapsed by subsequently heating the pile surfaced material but we have now found that if the material is heated from the side opposite to that on which the pile is formed and providing the degree of heating is controlled the performance of the product in use as determined by certain abrasion tests of those areas of the pile that have poor abrasion resistance may be considerably improved.

The present invention therefore provides a process in which a pile surfaced material comprising fibrils or tufts of a thermoplastic material integrally formed with a sheet of the thermoplastic material said sheet of thermoplastic material being bonded to a backing substrate is heated from the back to a temperature such that and for such a time that softening of the thermoplastic occurs but no substantial collapse of the pile occurs. By no substantial collapse of the pile we mean that the product retains its original pile like feel, texture and appearance although there may be some change in pile structure which can lead to improved wear properties.

The process of the present invention is particularly suitable for the treatment of pile surfaced materials which have been obtained by pressing a sheet of a thermoplastic material against a heated surface so that the face of the thermoplastic material against the heated surface is molten and then withdrawing the sheet from the surface so that fibrils are drawn out from the thermoplastic material. In this type of process a backing substrate for the pile may conveniently be provided by feeding either an already formed laminate of the thermoplastic and the backing material to the heated roll or alternatively the thermoplastic film and the substrate may be fed separately in such a way that the heated surface melts the whole of the thermoplastic sheet and bonds it to the backing substrate. In all of these processes we prefer that the pile be cooled as it is formed by the separation of the thermoplastic material from the heated surface. In the continuous operation of these processes the abrasion resistance of the product obtained tends to vary throughout the product certain areas being acceptable whilst others less so under these circumstances the techniques of the present invention are useful in improving those areas having poor abrasion resistance. In addition the texture and length of pile may readily be determined by careful control of the angle at which the material is withdrawn from the heated surface and also the extent to which the pile is cooled as it is withdrawn from the surface. As is described the material is preferably withdrawn from the heated surface over a suitably shaped rod and although it is preferred to cool this rod at the point where the web contacts it on separation from the surface the rod may be so shaped that the web remains in contact with the rod for some distance after it leaves the hot roll and in this instance the part of the rod with which the web is in contact after it has left the heated surface may itself be heated to achieve improved abrasion resistance according to this invention.

The process of the present invention is applicable to all thermoplastic materials but the temperature of the hot surface used for pile formation and the temperature to which the pile surfaced material itself should be heated to give the improved wear properties as shown by the improved abrasion resistance depends upon the nature of the material. The choice of thermoplastic material will depend upon the use to which the pile surfaced material is to be put but we have found particularly pleasing products may be obtained using polymers and copolymer of olefines such as polyethylene, polypropylene, ethylene propylene copolymers and with polymers and copolymers of vinyl chloride, polymers and copolymers of styrene, polyesters such as polyethylene terephthalate and the various nylons together with any other well known thermoplastic materials. The thermoplastic material may be supplied as an already formed film either direct from an extruder or from a reel of film that may be coated by for instance extrusion coating directly onto the backing material.

The backing substrate layer may be of any suitable material providing it may be bonded to the thermoplastic material and can withstand the processing techniques of the present invention. Example of particularly suitable materials include woven and nonwoven textile webs such as hesian, cotton net, glass fibre scrims and linen scrims. Alternatively the substrate may be of paper or metal or cardboard and may have holes formed therein to aid the adhesion between the substrate and the thermoplastic material. The reason for the improvement in abrasion resistance is not fully clear however it is thought that the heat may soften the base of the fibrils of the pile and improve the bond between the pile and the remainder of the thermoplastic and also the bond between the thermoplastic and the backing material. It is therefore important that the nature of the backing material is such that it is unaffected by the temperatures used and also has a sufficiently high thermal conductivity to ensure that the temperature of the thermoplastic is raised sufficiently to give the desired improvement in abrasion resistance. The heating conditions that are used according to the present invention will depend upon the thermal conductivity of the backing.

The pile surfaced material may be heated in any suitable manner but the most convenient method we find is to pass the material over the surface of a heated roll which may conveniently be provided as an extension to the process in which the pile surface is formed. Thus, in our preferred process for the production of pile surfaced material from a sheet of thermoplastic and a backing material a film of the thermoplastic material together with the backing material are first fed to a heated roll and the two pressed against the surface of the heated roll by a pressure backing roll in such a way that the thermoplastic material is adjacent to the surface of the heated roll and after passage around part of the circumference of the roll the two are separated from the surface of the roll. The temperature of the surface of the heated roll is such that the film of thermoplastic material is melted so that one side is bonded to the backing substrate and the other side adheres to the surface of the roll so that fibrils are drawn out from this side as the thermoplastic separates from the hot roll. In a preferred embodiment the sheet is withdrawn from the heated roll over a bar which controls the angle at which the material is withdrawn and a cooling fluid such as cold air is blown into the nip formed between the thermoplastic and the heated surface as the two separate.

The pile surfaced laminate obtained by the process described above may then be subjected directly to the techniques of the present invention and in our preferred process the pile surfaced laminate is passed from the pile forming process described above around part of the surface of a second heated roll where the back of the substrate material is against the surface of the roll, for sufficient time, to give the improved abrasion resistance of the pile. The time during which the material is in contact with the heated surface may be readily controlled by adjustment of the relative speeds of travel of the web and the heated roller and also the arc of the surface of the heated roll with which it is in contact. The temperature at which the second roll should be held depends upon three factors, the nature of the thermoplastic, the nature and thickness of the backing, and the time for which the material is heated. However, we have found that the second roll should generally be at a temperature between 60°, preferably 50° and 10° more preferably between 40° and 20° below the temperature of the roll where the pile is formed in continuous processes in which the speed of the webs on both rolls is the same. However, it must be appreciated that the optium conditions may readily be determined by trial and error. We have however found that the improved abrasion resistance without collapse of the pile may only be achieved by heating the material from the side opposite to that on which the pile is formed. One further improvement that is obtained in certain instances particularly with dark colored products is that products obtained by the process of this invention undergo a smaller color change when abraded than with similar but untreated pile surfaced products.

Before the web is further processed after it has been heated to improve abrasion resistance it should be cooled to avoid damaging the web. If the web travels some distance this may be sufficient to achieve the necessary cooling but if not cold air jets may conveniently be blown onto the pile surface.

We have also found that the adhesion between the thermoplastic material and the substrate may be further improved if the thermoplastic and the substrate are urged towards the heated roll upon which the pile is formed by a resilient means. For example a roll having a resilient surface may be used as may a belt of resilient material such as rubber or foamed plastic. The term resilient is used to describe a surface which is not hard and unyielding as in the case for example if a steel or ceramic surface pressure roll is employed and we have found that materials having a wide range of resilience or hardness such as a Shore hardness of 20, 40 or even 70 as mentioned on the Shore durometer type A2- (ASTM 76) are particularly useful.

The present invention is illustrated but in no way limited by reference to the accompanying drawing which shows a web of thermoplastic material 1 and a backing material 2 being fed via a feed roll 3 around a heated roll 4 in such a way that the thermoplastic material is against the surface of the heated roll. The thermoplastic material and the backing material pass around a considerable portion of the roll and are held against the roll by feed roll 3 and the pressure roll 5. The laminate of the thermoplastic and the backing material thus formed is peeled away from the surface of the roll over the bar 6 and cold air is directed from the jet 7 onto the web as it is being peeled away from the hot roll to set the fibres which are drawn out from the surface of the sheet and ensure that they remain integral with the thermoplastic material. The pile surfaced web then passes from the heated roll around the guide roll 8 and then around the surface of the heated roll 9 and it has been found that the presence of the heated roll considerably improves the abrasion resistance of the pile as compared with similar fabrics produced without the presence of the hot roll.

The process of the present invention is further illustrated but in no way limited be reference to the following examples.

EXAMPLE 1

The thermoplastic material was a film of low density polyethylene of thickness two thousandths of an inch and the backing a 63 gram/sq meter kraft paper, the first heated roll was at a temperature of 180°C and rotating at a speed of 1.5 meters per minute and the second heated roll was held at a temperature of 150°C with the web being in contact with an arc of the circumference of the roll of length 9 centimeters. Different runs were carried out using different speeds of rotation of the second hot roll and the results are summarised in the following table.

| Sample | Roll Speed (M/min) | Abrasion (cycles) |
| --- | --- | --- |
| Standard | — | 60 |
| A | 0.7 | 200 |
| B | 3.0 | 310 |
| C | 4.0 | 210 |
| D | 5.0 | 250 |
| E | 8.0 | 160 |
| F | 12.0 | 250 |

The Standard sample was not passed over the second heated roll and the value of 60 represented an unacceptably poor product.

The abrasion resistance of the pile was measured using the Taber abrader with 250 gram weights.

Similar runs were carried out but with the heat being applied as radiant heat from above and there was little increase in abrasion resistance.

EXAMPLE 2

A pile surfaced product was obtained by feeding a 65 micron thick low density polyethylene film together with a non-woven fabric backing of weight 40 grams/-square metre to the surface of a roll heated to 155°C with the polyethylene film between the backing and the roll. The laminate thus obtained was withdrawn from the hot roll whilst being cooled as illustrated in the drawing. Samples of the product thus obtained were subjected to the Shopper abrasion test (Deutsche Industrie Norm Standard 53863) whilst other samples were passed over the surface of a heated roll at a temperature of 120°C with the backing against the roll surface. The time for which the samples were in contact with the heated roll was varied and each sample was then subjected to the Shopper abrasion test. The results may be summarized as follows:

| Sample No. | Time for contact with second hot roll seconds | Average weight Loss during abrasion test % |
|---|---|---|
| 1 | 0 | 4.1 |
| 2 | 0 | 8.25 |
| 3 | 1.66 | 3.85 |
| 4 | 1.33 | 3.61 |
| 5 | 1.09 | 3.24 |
| 6 | 0.92 | 3.37 |

Thus it may be seen that the samples that had been subjected to the second heating had a greater uniformity of abrasion resistance than the control.

I claim:

1. In a method of making a pile-surfaced product having a pile of a thermoplastic polymer integrally attached to a layer of the same thermoplastic polymer, which method includes feeding a thermoplastic sheet and a backing substrate between two cooperating surfaces one of which is heated with the thermoplastic sheet facing the heated surface, the heated surface having a temperature sufficient to melt the thermoplastic sheet to bond said sheet and said backing substrate and to cause adhesion between the thermoplastic sheet and the heated surface, withdrawing said backing substrate and said thermoplastic sheet from said heated surface to form a pile of fibrils or tufts, on said sheet separating said pile from said heated surface and cooling said backing substrate, said pile and said thermoplastic layer, the improvement comprising: heating said thermoplastic layer from the side thereof having said backing substrate bonded thereto, said heating being for a time and to a temperature sufficient to improve abrasion resistance of the pile as measured by a standard abrasion test and as compared with a pile surfaced product made by a process the same as claimed herein but lacking only the step of heating a pile sheet from the substrate side, and said heating leaving the pile uncollapsed, said substrate being of a material adapted to bond to said thermoplastic sheet with heat and pressure and being otherwise unaffected by temperature of the process.

2. A process as in claim 1 in which the backing substrate is porous or perforated.

3. A process as in claim 1 in which the thermoplastic sheet is low density polyethylene and wherein the substrate side of the product is heated in the range 130° to 170°C.

4. A pile-surfaced product produced by the process of claim 1.

5. A process as in claim 1 in which the heating of the substrate side of the product is carried out by passing the substrate side of the product in contact with a heated roll.

6. A process as in claim 1 in which said heated surface is provided by a first heated roll and in which the heating of the substrate side of the product is carried out by passing the substrate side of the product in contact with a second heated roll.

7. A process as in claim 6 wherein the fibrils or tufts are cooled by a stream of cooling fluid as they separate from said first heated roll.

8. A process as in claim 6 wherein the temperature of said second heated roll is between 60° and 10°C below the temperature of said first heated roll.

9. A process as in claim 8 wherein the temperature of said second heated roll is between 50° and 10°C below the temperature of said first heated roll.

10. A process as in claim 8 wherein the temperature of said second heated roll is between 40° and 20°C below the temperature of said first heated roll.

* * * * *